Feb. 12, 1924.  
W. J. ROWE  
SNOWPLOW  
Filed April 21, 1923  
1,483,247  
3 Sheets-Sheet 2

Fig. 2.

Inventor
W. J. Rowe
By Lucy Lacey,
Attorneys

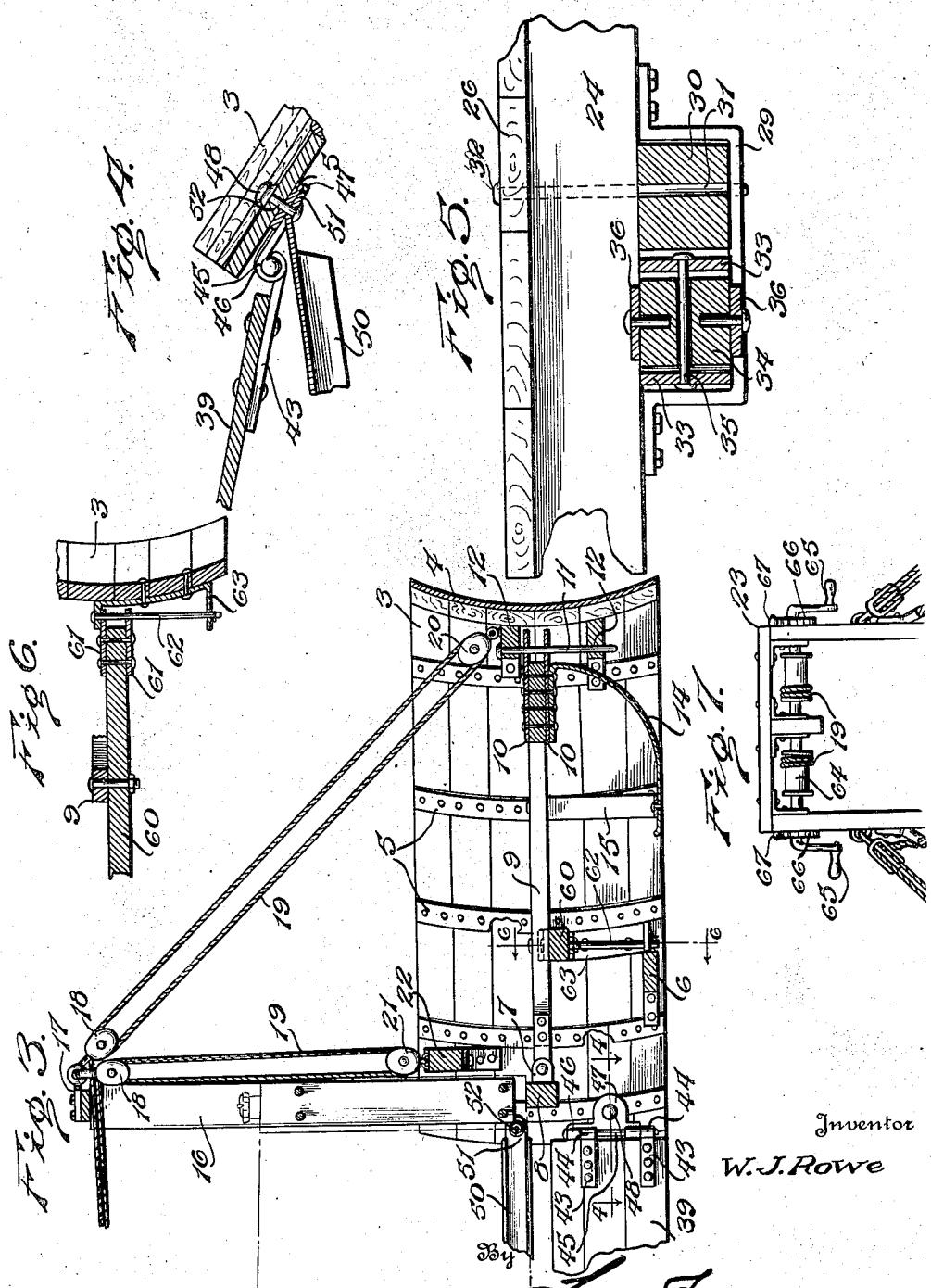

Patented Feb. 12, 1924.

1,483,247

UNITED STATES PATENT OFFICE.

WILLIAM J. ROWE, OF PORTLAND, MAINE, ASSIGNOR TO WESTBROOK GARAGE & MACHINE COMPANY.

SNOWPLOW.

Application filed April 21, 1923. Serial No. 633,685.

*To all whom it may concern:*

Be it known that I, WILLIAM J. ROWE, a citizen of the United States, residing at Portland, in the county of Cumberland and State of Maine, have invented certain new and useful Improvements in Snowplows, of which the following is a specification.

The object of this invention is to provide a strong, durable and efficient snow plow which may be produced at a low cost and which may be readily driven through snow drifts and banks so as to rapidly and easily clear away the same. Another object of the invention is to provide simple means whereby the width of the path formed by the plow may be readily regulated, and another object of the invention is to provide easily operated means for adjusting the height at which the plow will work. Other objects of the invention will appear incidentally in the course of the following description.

In the accompanying drawings:

Fig. 2 is a plan view of the same;

Fig. 3 is a longitudinal section on the line 3—3 of Fig. 2;

Fig. 4 is an enlarged detail section on the line 4—4 of Fig. 3;

Fig. 5 is an enlarged detail section on the line 5—5 of Fig. 2;

Fig. 6 is a detail section on the line 6—6 of Fig. 3, and

Fig. 7 is a detail of a portion of the rear upright frame.

Figure 1:
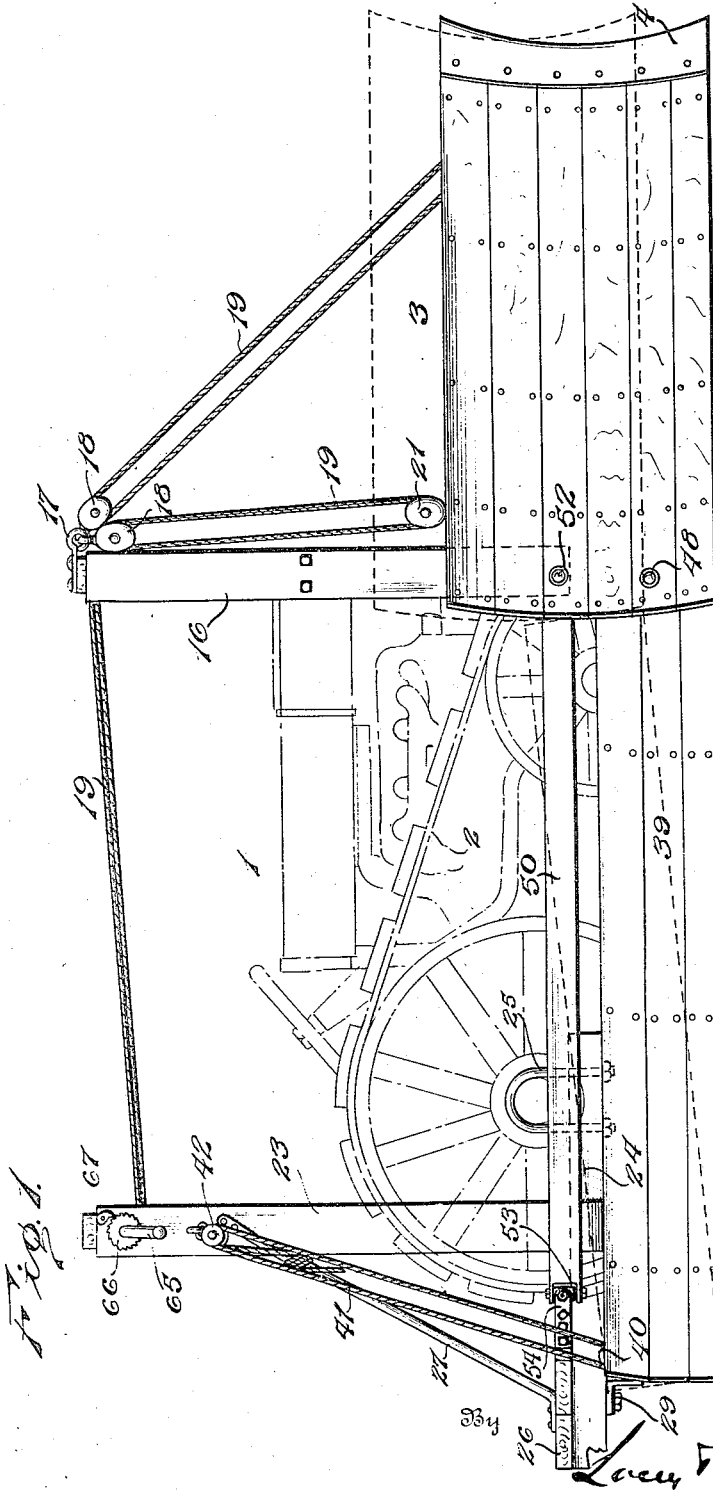
Figure 1 is a side elevation of a snow plow constructed in accordance with one embodiment of the invention.

My snow plow is intended particularly for connection to a tractor to be driven by the same and in advance and at the sides thereof. A tractor is indicated conventionally at 1 in the accompanying drawings, and, in order that it may travel readily over the snow, is shown equipped with tread members of the endless chain type, as indicated at 2, but the endless chain tread may be omitted. The plow comprises a point or nose 3 which consists of two rearwardly diverging members disposed in advance of the tractor and connected at their front meeting ends by a metallic shoe or wear plate 4, as clearly shown. The point or nose is also slightly concaved vertically so that it will not only break through the snow but also readily turn the same aside and roll it over as the plow advances. The diverging members of the plow may conveniently be constructed of stout boards connected and reinforced on their inner sides by strap irons 5, and adjacent the rear ends of the said diverging members, I secure thereto the cross bar or beam 6 whereby a very rigid structure is produced. Brackets 7 and a head 8 are secured to the front axle of the tractor, and to the said brackets are secured the rear ends of push bars 9 which converge forwardly and have their front ends secured between and connected by plates or brackets 10 which constitute a front coupling. A coupling pin 11 is fitted through the front projecting extremities of the plates or brackets 10 and through the socket members 12 secured on the rear inner side of the point or nose above and below the said coupling members, as clearly shown in Fig. 3, so that, when the tractor is caused to travel forwardly, the motion thereof will be transmitted through the push bars to the front end of the point or nose and the same will be driven into and through the snow. A runner 14 is secured to the under side of the lower bracket or plate 10 and runs upon the ground or the surface of the snow in rear of the front extremity of the plow point so that the said point will be prevented from digging into the ground and thereby arresting or impeding the progress of the plow, as will be readily understood. To maintain the runner in proper engagement with the ground or the surface of the packed snow, a hanger or brace 15 is secured to the push bars and to the rear end of the runner, as clearly shown in Fig. 3. A cross brace or beam 60 is secured to the push bars 9, and the ends of said beam are equipped with coupling plates 61 which fit slidably upon coupling pins 62 carried by brackets 63 secured upon the plow point or nose. The driving force exerted through the push bars is thus applied to the plow point or nose at the sides of the same as well as at the extreme front end thereof and in such manner that vertical adjustment of the point is permitted.

To the front end of the tractor frame or to any preferred part of the tractor at the front end thereof, for instance, to the sides of the radiator, I secure a vertical frame or derrick 16, upon the upper end of which I secure brackets 17 carrying pulley blocks 18, around which are trained cables 19, as shown. One of the cables 19 is carried to and about a pulley block 20 secured upon the upper socket or bar 12 or otherwise attached to the front extremity of the plow point, while the other cable 19 extends to and is trained around a pulley block 21 which is mounted upon the cross bar or beam 22 secured to and extending between the rearwardly diverging members of the point near the upper rear corners of the same. All the cables 19 are carried rearwardly over the tractor and secured in any convenient or preferred manner to a windlass 64 at the upper end of a frame 23 erected at the rear end of the tractor so that by winding the rear ends of the cables upon the windlass the plow point will be raised to any desired height. It will be readily understood that, by releasing the rear ends of the cables, the weight of the plow will cause the same to descend, whereas by exerting a pull upon the several cables the plow will be lifted bodily. In this manner, the plow may be set to run at any desired height and may be easily adjusted so that it will not be forced into the snow at such a depth that it cannot progress, and by making several trips over the same stretch of road and successively lowering the point, the snow may be readily cleared away to any desired extent and, if necessary, may be removed until the ground is exposed. A windlass is provided for each cable 19 and it is operated by a crank handle 65, a ratchet wheel 66 being fixed upon each windlass shaft to be engaged by a pawl 67 on the frame 23 whereby the parts will be held in a set position.

The frame 23, like the frame 16, is composed of vertical posts and a cross bar connecting the upper ends of the same. The lower ends of the side posts of the rear frame 23 are secured to sills 24 which are secured in any convenient manner, as by clip bolts 25, upon the rear axle housing of the tractor, and these sills extend rearwardly beyond the vertical frame 23 to carry a platform 26 upon which an operator may stand. Braces 27 are secured to and extend between the platform 26 and the side posts of the frame 23 so as to prevent collapse of the platform, and crossed braces 28 are provided between the sills so as to lend additional rigidity to the structure. To the under side of the platform or to reinforcing bars provided thereat, I secure stirrups or brackets 29 through which play beams 30 which project beyond the sides of the platform and are provided with longitudinal series of vertical openings 31 through which, and the platform, pins 32 may be inserted so as to hold the beams in a set position. Each beam is equipped at one end with a coupling bracket 33 in the outer end of which is pivotally mounted a coupling block 34, the pivot 35 of the said block being disposed horizontally or parallel with the under surface of the platform. It will be readily noted by reference to Fig. 2 that the pivoted coupling blocks and the brackets carrying the same are disposed alternately at opposite sides of the platform and to each coupling block is pivotally attached a link bar 36 which extends outwardly therefrom and is pivotally connected to the upper and lower sides of the block. The outer ends of the link bars 36 are pivotally mounted upon pins or bolts 37 carried by brackets 38 on the inner sides of wings 39 adjacent the rear ends thereof. Pulley blocks 40 are mounted upon the wings 39 adjacent the rear ends thereof, and cables 41 are trained around the said pulley blocks and similar pulley blocks 42 secured upon the frame 23 so that the rear ends of the wings may be readily adjusted vertically. At the front end of each wing 39 is secured a hinge plate or leaf 43 which is constructed at its front edge with eyes 44 engaged around a pintle 45 which is supported in eyes or hooks 46 upon the rear end of a hinge plate or leaf 47 which is carried by the plow point at the rear end thereof. This hinge leaf or plate 47 is attached to the plow point by a pivot bolt 48 disposed at a right angle to the pintle 45 so that movement of the wing in all directions relative to the plow point is permitted. The connections between the link bars 36 and the wings and the beams 30, respectively, constitute universal joints so that, if the plow point be adjusted vertically by manipulation of the cables 19, the wings may be set to operate at a downward and rearward inclination relative to the point or the point may be set at a relatively low position and the wings set so as to incline relatively upwardly therefrom. These adjustments of the plow point and the wings will readily accommodate the apparatus to any given conditions or depth of snow. The wings may also be adjusted laterally so that the path formed by the machine may be of any desired width within the capacity of the machine. This lateral adjustment of the wings is effected by merely sliding the beams 30 through the stirrups 29 and securing them in the set position by the pins 32 in an obvious manner, the cables 41, of course, being played out as the wings are adjusted. The ends of the cables may be secured in any convenient manner, and may be merely tied around the braces 27 or wrapped about the main runs of the cables or otherwise secured against accidental release.

I have also shown rear push bars 50 which extend between the platform and the plow point and may be advantageously employed as they relieve the strain put upon the front axle by the push bars 9. These rear push bars are preferably formed of channel metal each set on one side flange and having the connecting web extended beyond their front ends and deflected to form a tongue 51 which is pivoted to the plow point by a bolt 52. The rear end of each bar 50 is forked and pivotally attached to a block 53 which, in turn, is pivoted to and between brackets 54 secured to the platform, the pivot of the block being disposed at a right angle to the pivot of the bar.

From the foregoing description, taken in connection with the accompanying drawings, it is thought the operation and advantages of my improved snow plow will be readily understood. The plow point operates in advance of the tractor and its vertical adjustability will permit it to be set so that it will readily penetrate the snow banks and drifts and will turn aside and roll the snow so that a path will be quickly formed. The wings may be easily set to any desired position and will widen the path initially formed by the point, and the particular connections between the rear ends of the wings and the platform serve as efficient braces to prevent collapse of the wings and hold them to the work, as will be readily understood. While the construction of the plow point is strong and durable, the arrangement of the parts is such that excess weight is avoided and the apparatus may be used for a long period without requiring repairs.

Having thus described the invention, what is claimed as new is:

1. A snow plow comprising a push element, means for securing the push element upon the front end of a power unit, a cross bar secured to the push element, a rigid point, coupling pins carried by the point and engaged with the ends of the cross bar and the front end of the push element for vertical movement relative thereto, and means for raising and lowering the point bodily.

2. A snow plow comprising a point, push bars disposed in rear of the point, coupling plates secured to the front ends of the push bars, a coupling pin carried by the point and engaged through the front ends of said coupling plates, for relative vertical movement, means for applying force to the rear ends of the push bars, a runner secured to the under side of the push bars at the front ends thereof and extending rearwardly therefrom, and a hanger secured to the push bars and the runner.

3. A snow plow comprising a point, means for coupling the point to the front end of a power unit, wings attached to the sides of the point at the rear ends thereof, a frame erected upon the power unit at the rear end thereof, and connections between said frame and the wings whereby to adjust the wings laterally and vertically.

4. A snow plow comprising a point, wings hinged at their front ends to the rear ends of the point, a platform between the rear ends of the wings, beams supported on the platform and adjustable transversely thereof, and link connections between said beams and the rear ends of the wings.

5. A snow plow comprising a point, wings connected at their front ends with the rear ends of the point and having universal movement relative thereto, a platform disposed between the rear ends of the wings, and means supported by the platform for adjusting the rear ends of the wings vertically and laterally.

6. A snow plow comprising a point, wings having their front ends attached to the rear ends of the point and having universal movement relative thereto, a platform disposed between the rear ends of the wings, beams carried by the platform and movable transversely of the same, means for securing the beams in a set position relative to the platform, link bars each having its inner end attached to the outer end of one of the beams by a universal joint and having its outer end hinged to the respectively adjacent wing, and means controlled from the platform for adjusting the wings vertically.

7. A snow plow comprising a point, wings having their front ends attached to the rear ends of the point and having universal movement relative thereto, a platform disposed between the rear ends of the wings, beams carried by the platform and movable transversely of the same, means for securing the beams in a set position relative to the platform, and link bars each having its inner end attached to the outer end of one of the beams by a universal joint and having its outer end hinged to the respectively adjacent wing.

8. A snow plow comprising a point consisting of rearwardly diverging side members, wings having their front ends disposed adjacent and at the inner sides of the rear ends of said diverging side members, hinge plates pivotally attached to the said side members adjacent the rear ends thereof, mating hinge plates secured to the front ends of the wings, pintles connecting the said hinge plates whereby the wings may have vertical and lateral movement relative to the side members of the point, and means acting on the rear ends of the wings for holding them in a set position.

9. A snow plow comprising a plow point, push bars connected to the front end of the power unit and coupled to the front end of the plow point, and other push bars connected to the rear end of the power unit and coupled to the rear end portions of the plow point.

In testimony whereof I affix my signature.

WILLIAM J. ROWE. [L. S.]